US007659522B2

(12) United States Patent
Kim et al.

(10) Patent No.: US 7,659,522 B2
(45) Date of Patent: Feb. 9, 2010

(54) METHOD OF PURIFYING THE USED O-18 ENRICHED CYCLOTRON TARGET WATER AND APPARATUS FOR THE SAME

(75) Inventors: Jae Woo Kim, Yusung-gu (KR); Taek Soo Kim, Seo-gu (KR); Se Won Bae, Gimhae (KR); Sang Wook Kim, Seo-gu (KR)

(73) Assignee: Korea Atomic Energy Research Institute (KR)

( * ) Notice: Subject to any disclaimer, the term of this patent is extended or adjusted under 35 U.S.C. 154(b) by 431 days.

(21) Appl. No.: 11/806,310

(22) Filed: May 31, 2007

(65) Prior Publication Data

US 2008/0187087 A1 Aug. 7, 2008

(30) Foreign Application Priority Data

Feb. 2, 2007 (KR) ..................... 10-2007-0010936

(51) Int. Cl.
*G01N 21/01* (2006.01)
*G01N 21/51* (2006.01)
*G01N 23/10* (2006.01)
*G01N 23/12* (2006.01)

(52) U.S. Cl. .................. 250/432 R; 250/428; 250/429; 250/430; 250/431; 250/432; 250/435; 250/436; 376/190; 376/194; 376/195

(58) Field of Classification Search ......... 250/428–432, 250/435, 436, 432 R; 376/190, 194, 195
See application file for complete search history.

(56) References Cited

U.S. PATENT DOCUMENTS 6,567,492 B2 * 5/2003 Kiselev et al. .............. 376/195

OTHER PUBLICATIONS

"Purification by Ozonolysis of 180 enriched water after cyclotron irradiation and the utilization of purified water for the production of [18F]-FDG (2-deoxy-2-[18F]-fluoro-D glucose)" Asti, M., Grassi, E., Sghedoni, R., De Pietri, G., Fiorini, F., Versari, A., Borasi, G., Salvo, D. Applied Radiation and ISotopes, vol. 65, (2007) pp. 831-835.*

"An Automated system for oxygen-18 water recovery and fluorine-18 delivery" Schueller, M., Ferrieri, R.A., Schyler, D.J., Nuclear Instruments and Methods in Physics Research B 241 (2005), pp. 660-664.*

"Performance assessment of )-18 water purifier" Kitano, H., Magata, Y., Tanak, A. Mukai, T., Kuge, Y., Nagatsu, K., Saji, H. Annals of Nuclear Medicine vol. 15, No. 1, pp. 75-78 (2001).*

Sewon Bae, et al., "Purification of the organic impurities contained in the used cyclotron target water using catalytic reaction of dissolved oxygen under UV irradiation," Transactions of the Korean Nuclear Society, Autumn Meeting, Gyeongju, Korea, Nov. 2-3, 2006, pp. 1-2.

* cited by examiner

*Primary Examiner*—Bernard E Souw
*Assistant Examiner*—Meenakshi S Sahu
(74) *Attorney, Agent, or Firm*—McDermott Will & Emery LLP

(57) ABSTRACT

A method of purifying the used O-18 enriched cyclotron target water contaminated by the various organic compounds, the method including: supplying gaseous oxygen into the target water to be purified; irradiating UV rays having wavelengths of 254 nm and 185 nm on the target water; and releasing the gases generated during the purification oxidation process.

16 Claims, 10 Drawing Sheets

METHOD OF PURIFYING THE USED O-18 ENRICHED CYCLOTRON TARGET WATER AND APPARATUS FOR THE SAME

CLAIM OF PRIORITY

This application claims the benefit of Korean Patent Application No. 2007-0010936 filed on Feb. 2, 2007, in the Korean Intellectual Property Office, the disclosure of which is incorporated herein by reference.

BACKGROUND OF THE INVENTION

1. Field of the Invention

The present invention relates to a method of purifying organic impurities contained in the used cyclotron target water and an apparatus for the same, and more particularly, to a method for removing the organic impurities in the used O-18 enriched cyclotron target water contaminated during radioisotope F-18 production by using UV radiations generated from the low pressure mercury (Hg) lamp and catalytic photo-reaction of dissolved oxygen (DO) and an apparatus employing the method.

2. Description of the Related Art

In general, the present invention relates to purification of the organic impurities contained in the used cyclotron target water and its apparatus. More specifically, this invention is focused on purifying technique and its apparatus for removing the organic impurities in the used O-18 enriched cyclotron target water contaminated during radioisotope F-18 production by using UV radiations generated from the low pressure Hg lamp (L-lamp hereafter) and catalytic photo-reaction of dissolved oxygen (DO).

Oxygen isotope consists of 99.76% of O-16, 0.04% of O-17, and 0.2% of O-18 in nature. O-18 enriched water (>90%) is used as a target in a cyclotron for production of the β-emitting radioisotope F-18 (half-life=109.7 min) under O-18(p,n)F-18 reaction. F-18 is essential for PET (Positron Emission Tomography) pharmaceutical [F-18]-labeled 2-deoxyglucose (FDG) synthesis. Since O-18 is very expensive and the demand for O-18 stable isotope increases as the superior tumor diagnostic feasibility obtained from PET increases, it is important to re-use the cyclotron target again.

After the O-18 enriched target water is irradiated by protons in a cyclotron, it contains various organic substances such as acetone ($CH_3COCH_3$), ethanol ($CH_3CH_2OH$), methanol ($CH_3OH$), and acetonitrile ($CH_3CN$), etc. which are contaminated during the $F^-$ ion separation and target cleaning processes. These organic impurities may increase the target vapor pressure and decrease the target life-time as a result. More importantly, they inhibit the separation of the generated $^-F$ ions in the target medium after proton irradiation. The concentration of the organic impurities must be maintained below 10 ppm to be used in a cyclotron again. This is why those organic impurities in the target must be removed before it is used again.

Oxidation of organics by UV irradiation is known as the most popular processes for removing the organic substances contained in an aqueous solution. However, O-18 water purifier that uses only UV irradiation may not be applicable for purification of O-18 enriched target water since its purifying efficiency is very low.

While an advanced oxidation process which combines UV irradiation with catalysts such as $H_2O_2$, $O_2$, $O_3$ and $TiO_2$ has been widely applied for removing organic materials in an aqueous solution, UV irradiation process with catalysts must be applied cautiously for the remediation of the cyclotron target water whose purity should remain as it was. It is because sometimes more difficult to remove the remaining catalysts and the newly produced products in the medium after the catalytic reaction of the purification process.

It is also important for the purification scheme to recover the purified target water as much as possible while the concentration of O-18 in the water should be maintained as high as possible.

Even though a commercial O-18 target water purifier developed by SUMITOTO from Japan is sufficient in the degrees of purification and also recovery, the price of the equipment is very high and the quantity of the sample that can be purified during a day is limited. Also the purification process is complicated since it uses UV irradiation together with cold distillation.

Hence, the technique and apparatus, which can purify the organic impurities in the sample to below 10 ppm while more than 98% of the initial samples in average can be collected after the process at the same time, are necessary.

SUMMARY OF THE INVENTION

An aspect of the present invention provides an economical use of O-18 enriched cyclotron target water with a technical solution and apparatus with high recovery rate and efficiency for purification of the used O-18 enriched cyclotron target contaminated by various organic impurities.

According to an aspect of the present invention, there is provided a method of purifying the used O-18 enriched cyclotron target water contaminated by the various organic compounds, the method including: supplying gaseous oxygen into the target water to be purified; irradiating UV rays having wavelengths of 254 nm and 185 nm on the target water; and releasing the gases generated during the purification process by oxidation process.

According to another aspect of the present invention, there is provided an apparatus for purifying the used O-18 enriched cyclotron target water contaminated by the various organic compounds, the apparatus including: a reservoir for containing the target water; an UV irradiator irradiating UV rays on the target water transferred from the reservoir; a heat exchanger cooling the target water of a high temperature, transferred from the UV irradiator; a spectroscopic part measuring concentration of the organic impurities in the target water transferred from the UV irradiator; and a peristaltic pump circulating the target water, wherein the target water receives gaseous oxygen in the reservoir, flows out from the reservoir through the UV irradiator, the heat exchanger, and the spectroscopic part, and flows into the reservoir again.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
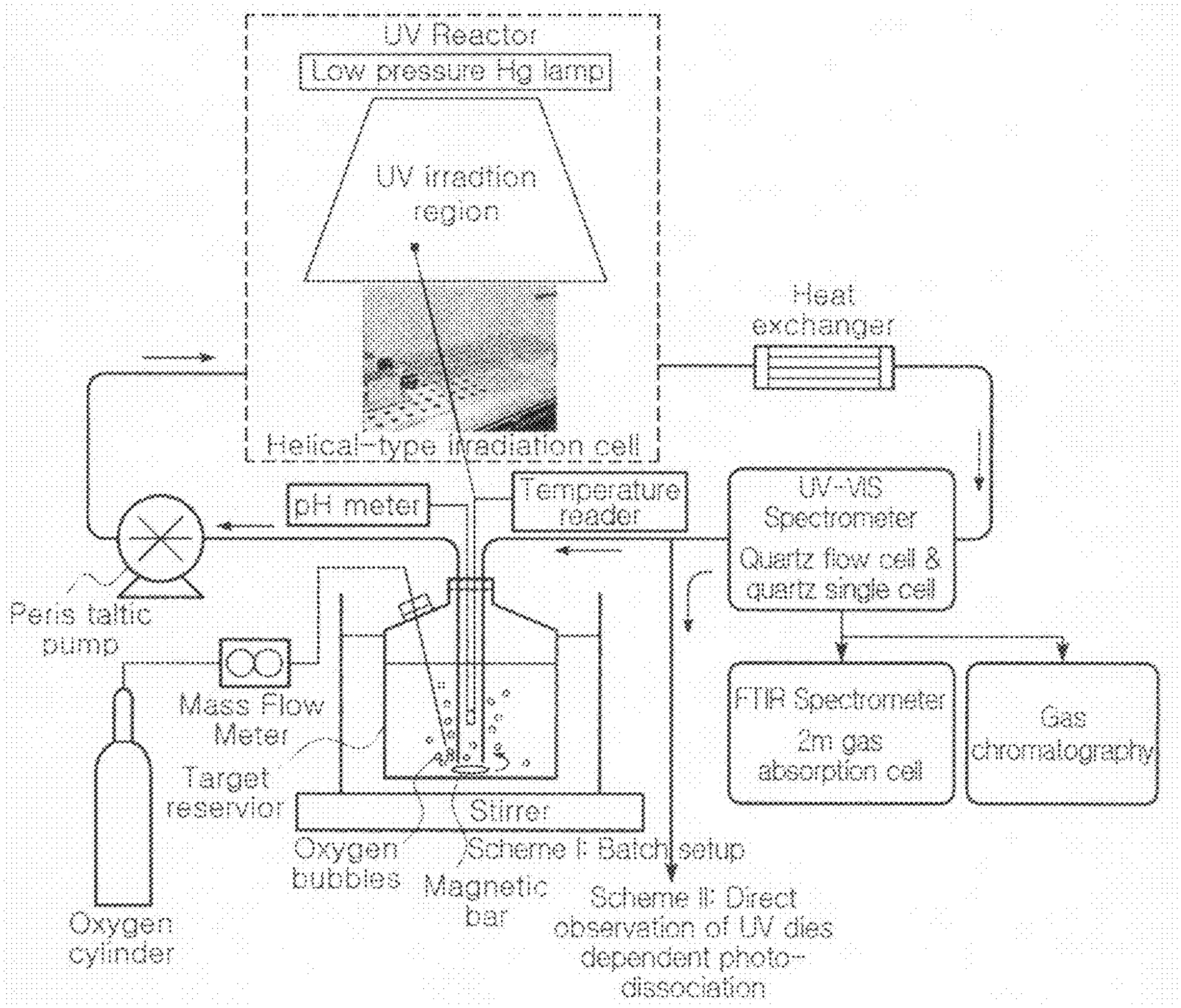
FIG. 1 is a systematic diagram of the purification system based on an exemplary embodiment of the present invention.
Figure 2A:
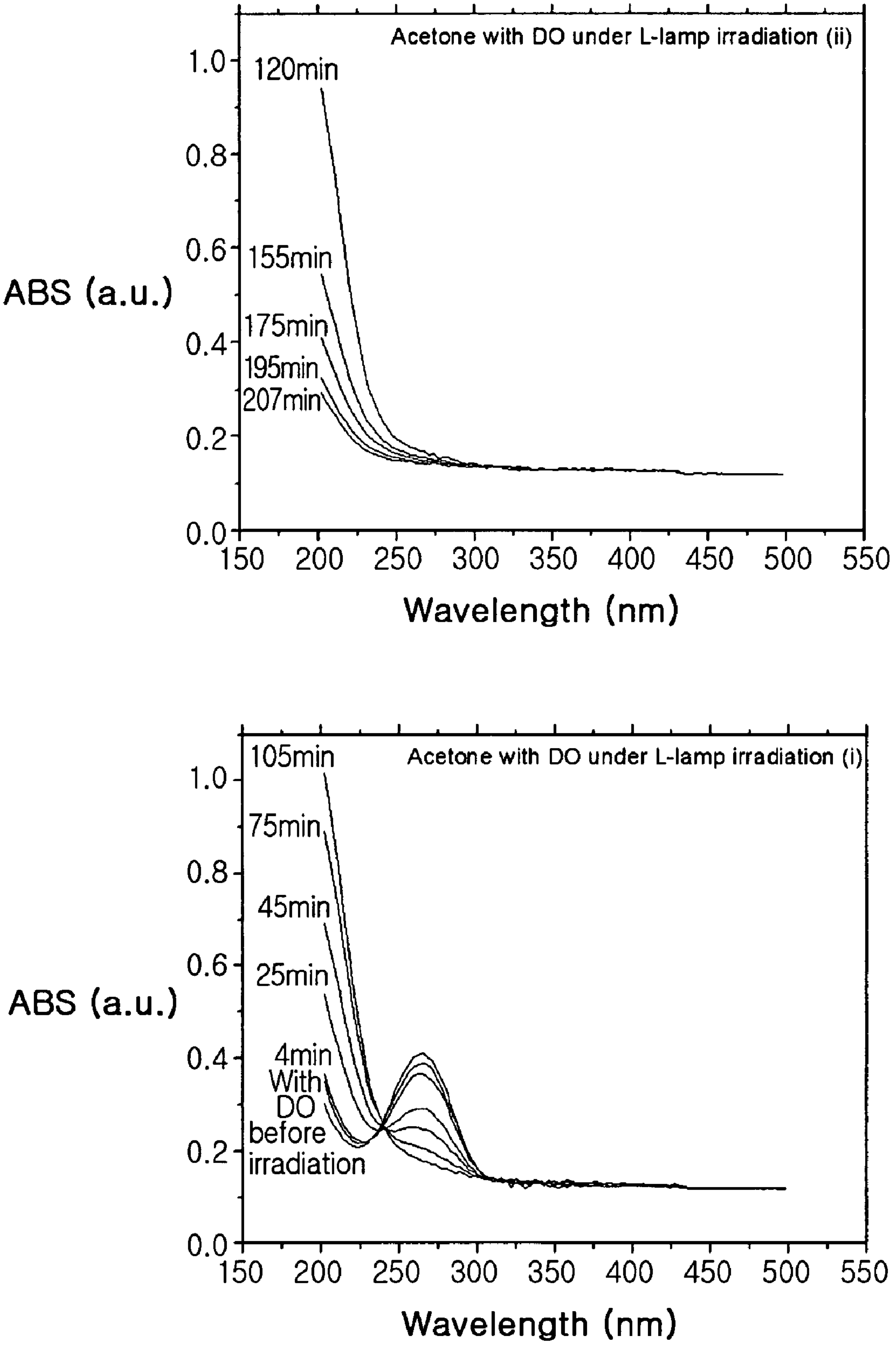
FIG. 2 are the graphs illustrating UV-VIS spectrum of organic removals with and without DO under the L-lamp UV irradiation for acetone, methanol and ethanol.
Figure 2B:
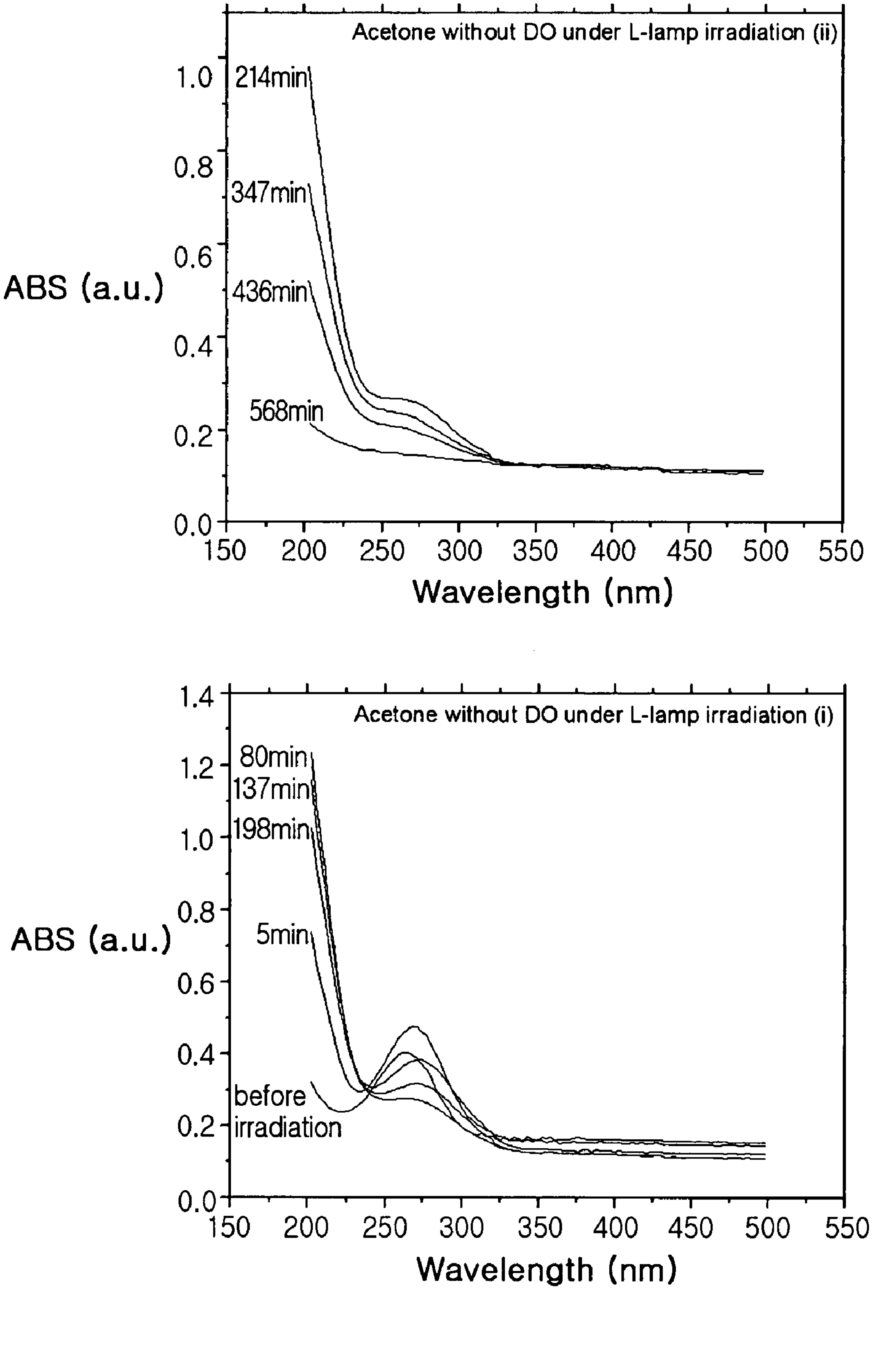
Figure 2C:
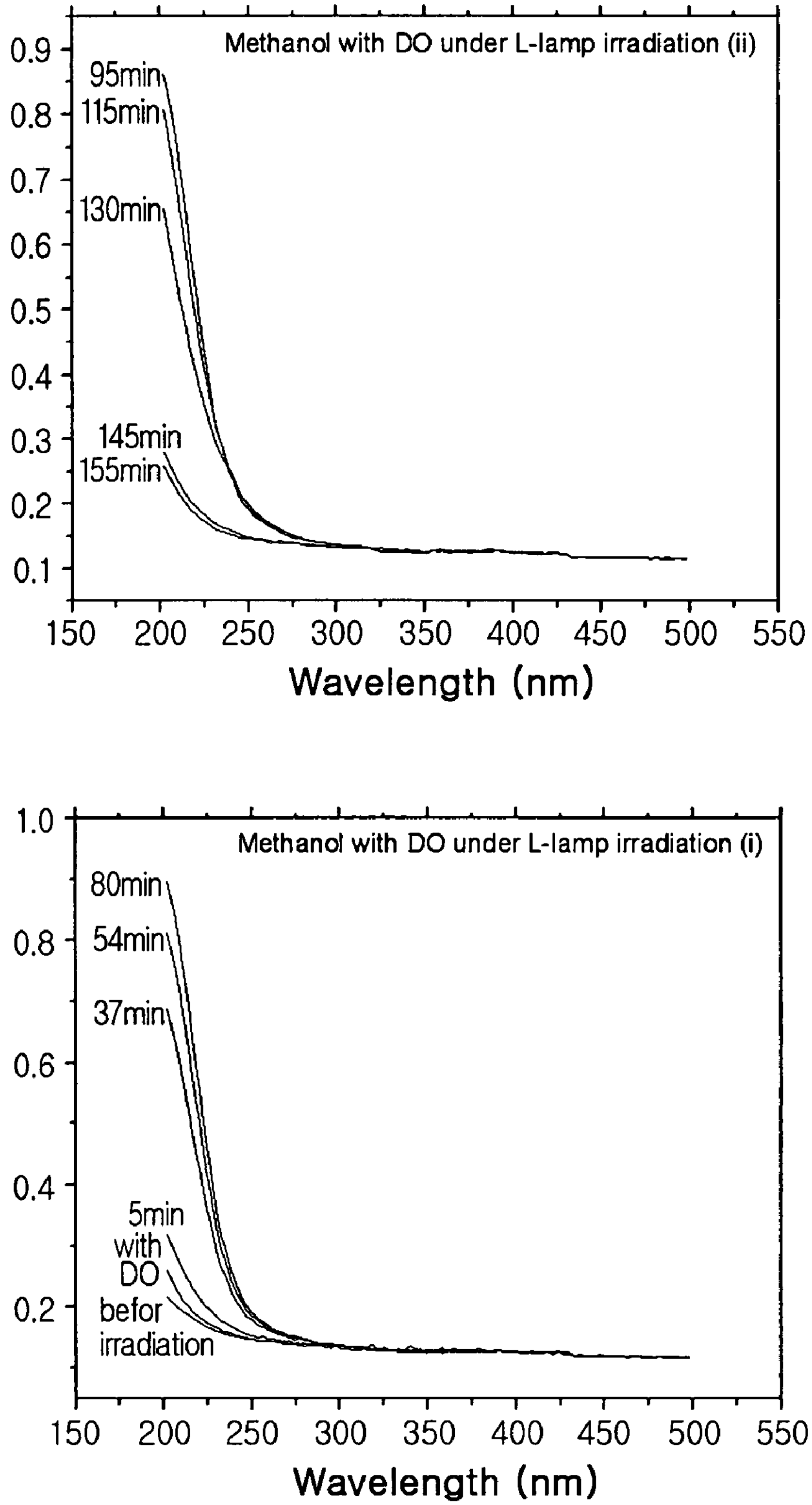
Figure 2D:
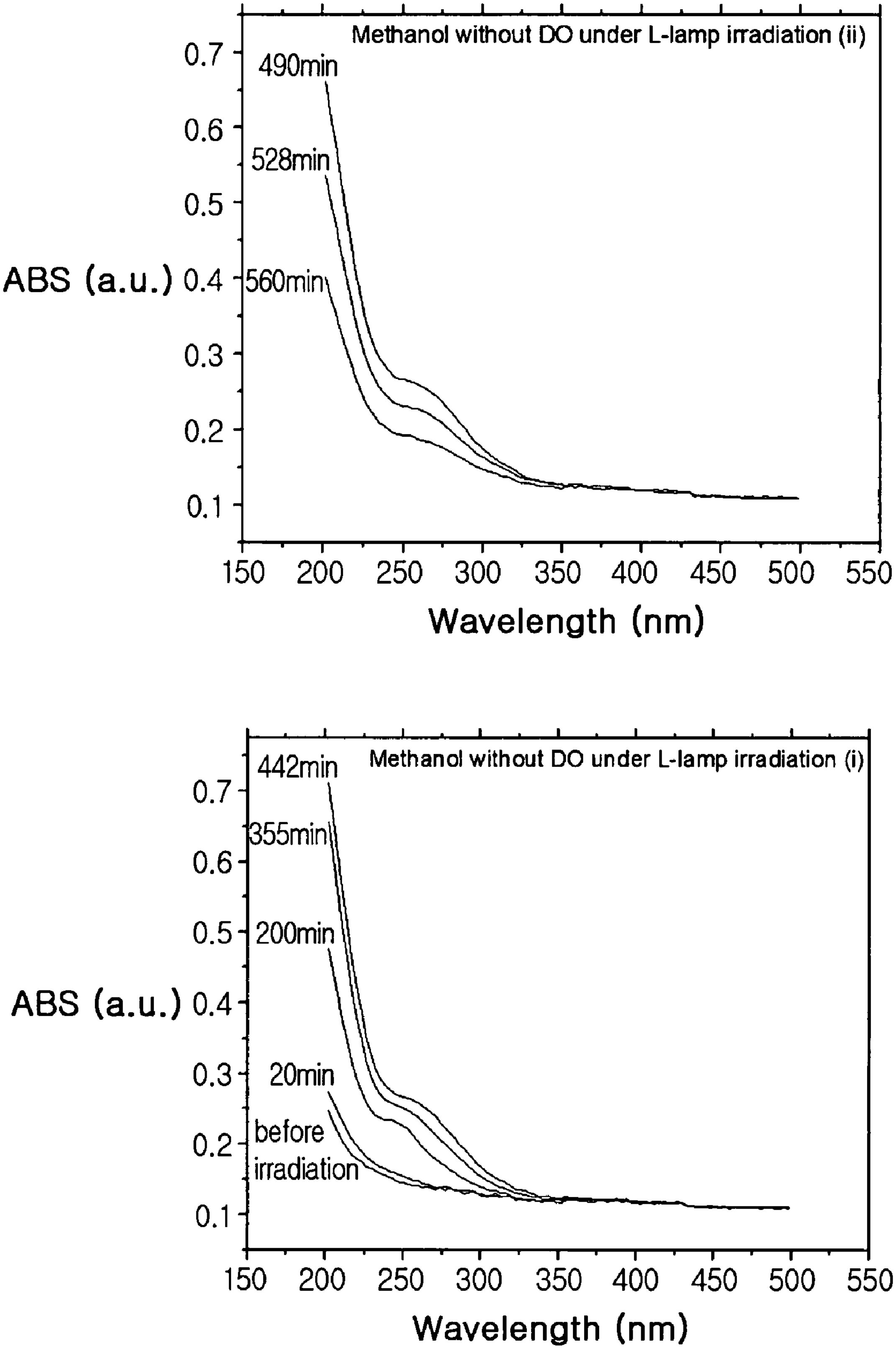
Figure 2E:
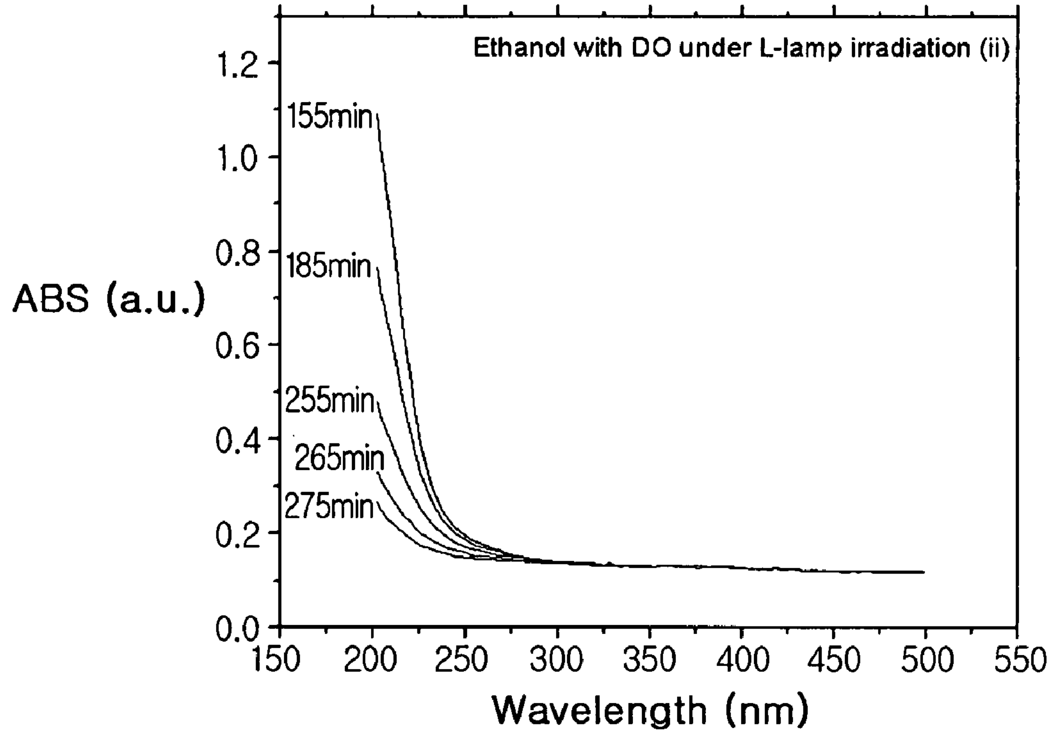
Figure 2E:
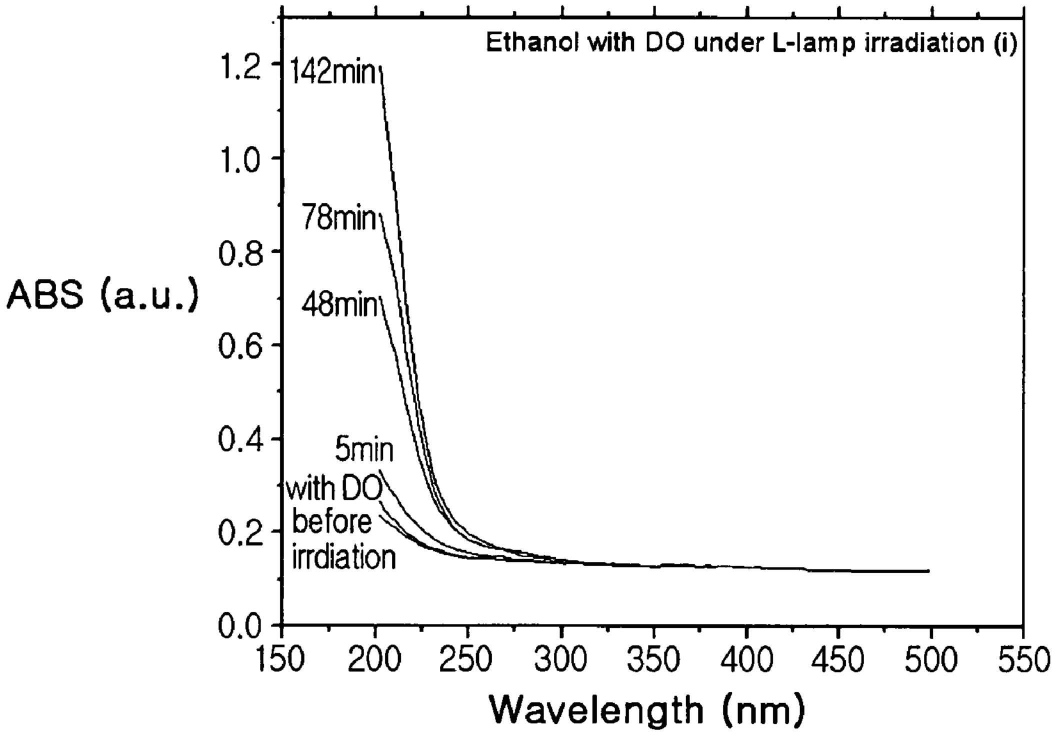
Figure 2F:
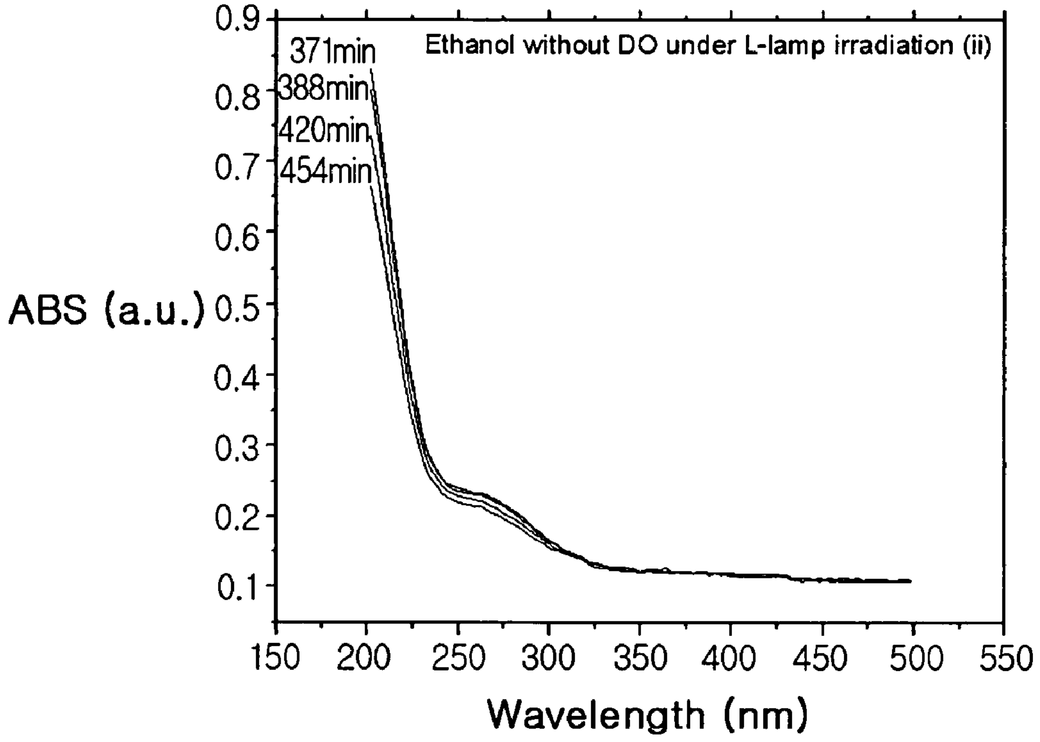
Figure 2F:
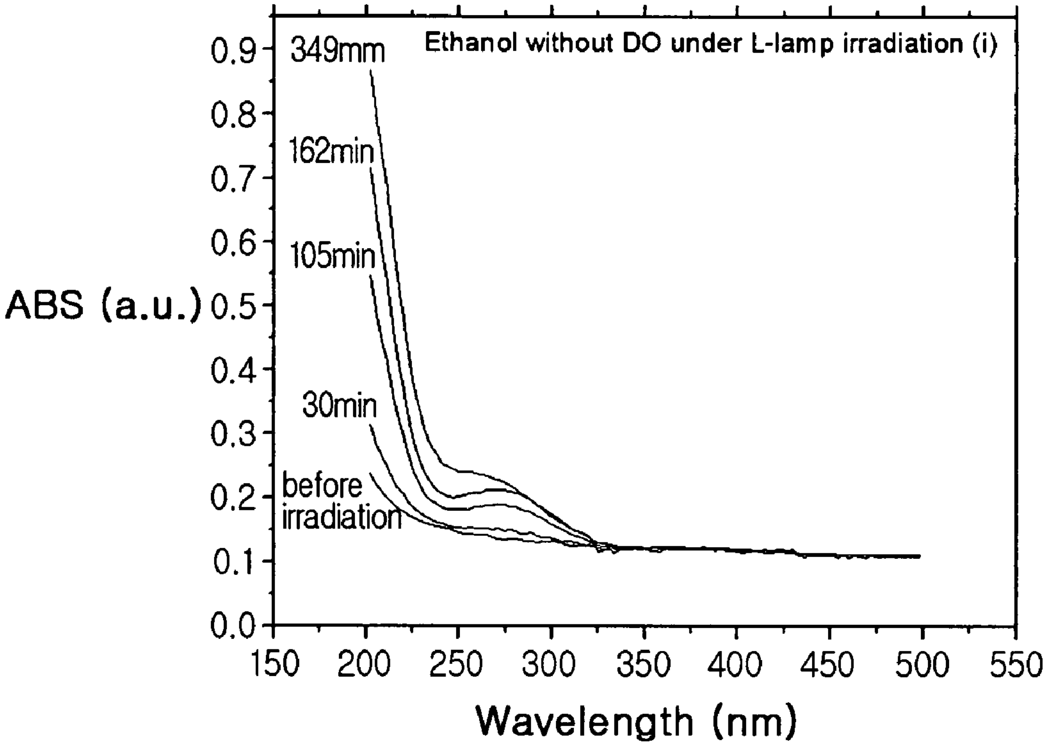
Figure 2G:
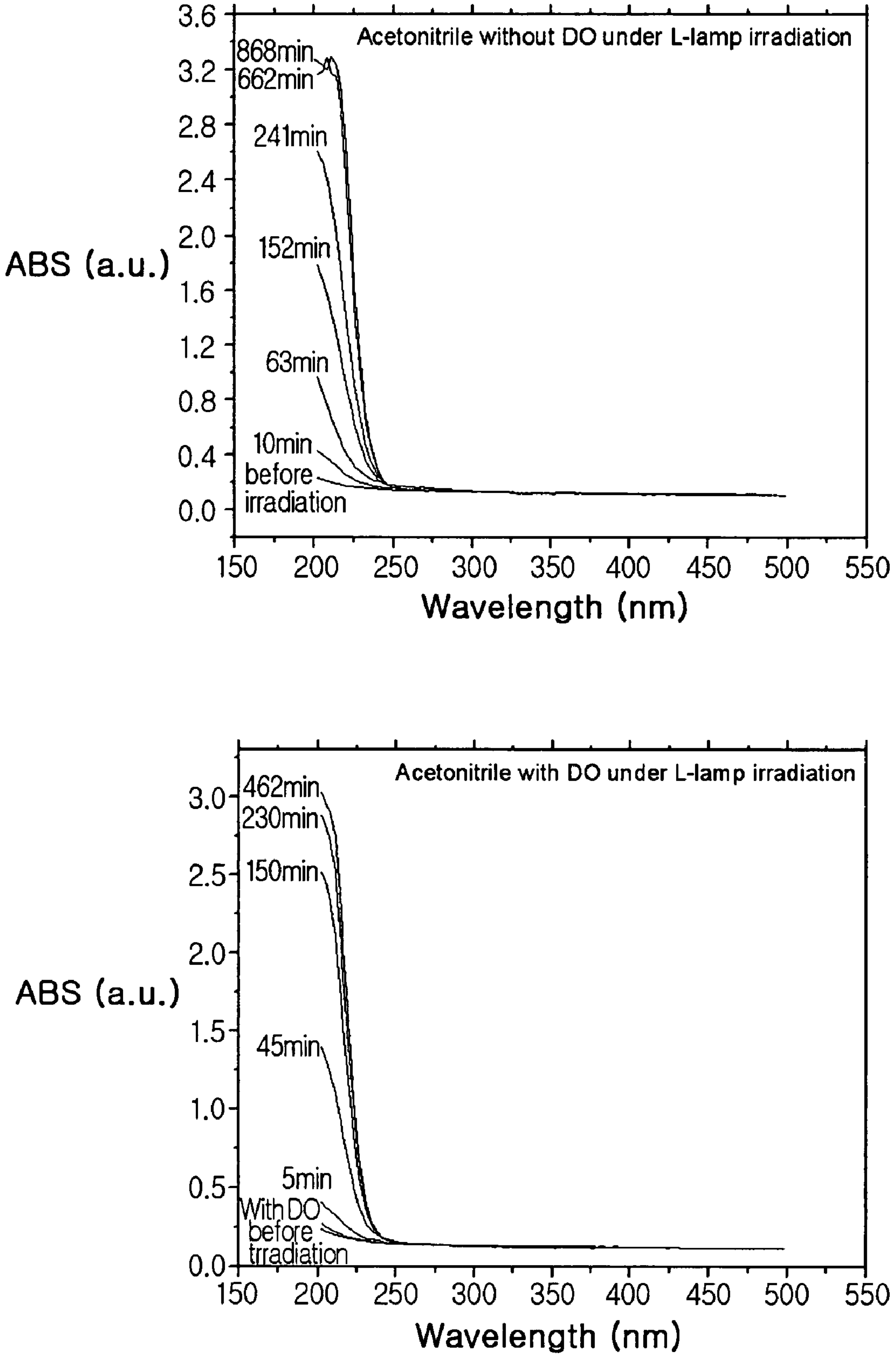

Exemplary embodiments of the present invention will now be described in detail with reference to the accompanying drawings.

Even though purification of the organic impurities contained in an aqueous solution using oxidation of UV irradiation is well known, wavelength dependent efficiency of purification is not fully explored due to lack of confident understanding of the process.

Wavelengths generated from the mercury (Hg hereafter) lamp are variable depending on the pressure of Hg contained in the lamp. Inventors found that purification efficiency is increased dramatically when UV wavelengths, 185 nm and 254 nm, generated from the L-lamp are irradiated to the sample as the dissolved oxygen concentration is increased by bubble the gaseous oxygen into the sample producing the photo-catalytic reaction.

C—H or C—C bonds of the organics can be dissociated by absorption of UV irradiation of the 254 nm wavelength while VUV (Vacuum Ultra-Violet) irradiation of the 185 nm wavelength can dissociate O—H bond generating very reactive hydroxyl radicals (.OH). Furthermore, VUV irradiation of the 185 nm wavelength is known to dissociate oxygen molecules to the reactive oxygen species (O*).

The organic impurities contaminated in the O-18 enriched target water during the radioisotope F-18 production and [F-18]FDG synthesis are acetone ($CH_3COCH_3$), ethanol ($CH_3CH_2OH$), methanol ($CH_3OH$), and acetonitrile ($CH_3CN$). As shown in equations (1) to (4), these organic compounds might be dissociated into various acids and aldehydes by dissociations of C—H or C—C bonds upon irradiation of 254 nm and 185 nm wavelengths.

$$CH_3OH\text{->}HCOOH+HCOH \quad (1)$$

$$CH_3CH_2OH\text{->}CH_3COOH+CH_3COH+CH_3COCH_3 \quad (2)$$

$$CH_3COCH_3\text{->}CH_3COOH+CH_3COH+CH_3OH \quad (3)$$

$$CH_3CN\text{->}HOCN+CH_3COCH_3+CH_3CONH_2+NH_3 \quad (4)$$

Under the UV irradiation of methanol, formic acid and formaldehyde are assumed to be generated as intermediate fragments (Eq. 1), while acetic acid, acetone and acetaldehyde are produced by ethanol (Eq. 2). Acetone could produce acetic acid, acetaldehyde, and methanol as well (Eq. 3). Cyanic acid, acetone, acetamide, and ammonia might be formed during UV irradiation of acetonitrile (Eq. 4).

The hydroxyl radicals (.OH) and reactive oxygen species (O*) generated under the VUV irradiation of the 185 nm wavelength of water and dissolved oxygen (DO hereafter) respectively are efficiently oxidize the intermediate photo-dissociation products such as acids and aldehydes producing $CO_2$ and $H_2O$. According to the experimental results based on this invention, purification efficiency of UV irradiation alone with the hydroxyl radicals (.OH) is not as efficient as the purification used with reactive oxygen (O*) generated from the DO. Hence, the concentration of DO in the sample is very important and critical to maximize organic removal efficiency.

Since it is important to increase and to maintain the concentration of DO in the sample, an oxygen gas supply system is necessary for continuous supply of oxygen into the sample while the DO concentration in water is dependent on the temperature in general. It is recommended to supply the oxygen gas with the flow rate of 150~250 sccm (standard cubic-centimeter) corresponding to the DO concentration between 10~40 ppm at about 20° C. The DO concentration in the sample is saturated at the flow rate of 250 sccm while the flow of 150 sccm is not sufficient to maintain the DO concentration. Gaseous oxygen may be supplied directly into the sample reservoir or into the flow line right before entering the UV irradiation section.

The dissociation processes for the hydroxyl radicals (.OH) and reactive oxygen species (O*) generation under the VUV irradiation of water and the DO are shown as follows:

$$H_2O+h\nu_{185nm}\rightarrow .H+.OH \quad (5)$$

$$O_2+h\nu_{185nm}\text{->}O^*+O^* \quad (6)$$

Here, O* indicates a reactive oxygen species.

The hydroxyl radicals (.OH) and reactive oxygen species (O*) generated based on the above Eq. 5 and Eq. 6 oxidize the intermediate photo-dissociated by-products and remove the organic impurities by producing $CO_2$ and $H_2O$ as a result of the oxidation process.

By irradiating an aqueous solution contaminated by various organic impurities using the UV and VUV wavelengths, the efficiency of the present purification process is synergetic with the oxidation of the organics under UV irradiation as well as the photo-catalytic reaction of the DO under VUV irradiation as follow; Step 1) Generation of the intermediate products by dissociation of C—H or C—C of the organics under irradiation of 185 and or 254 nm wavelengths, Step 2) Generation of the hydroxyl radicals (.OH) from water molecules and reactive oxygen species (O*) from the DO under irradiation of 185 nm wavelength, Step 3) Generation of $CO_2$ and $H_2O$ by oxidation process of the intermediate products or the initial organics compounds with the hydroxyl radicals (.OH) and the reactive oxygen species (O*).

Furthermore, the present invention includes the step which increases purification efficiency by generation ozone ($O_3$) under the reaction Eq. 7 of the DO with the O*.

$$O_2+O^*\text{->}O_3 \quad (7)$$

As a very reactive oxidizer, ozone may increase the oxidation of the various organics or the intermediate products without any side effects mentioned earlier, since it can be removed efficiently due to its status at the normal temperature.

Since after, the detailed explanation of an O-18 enriched cyclotron target water purification apparatus developed based on the present invention is presented.

The present invention includes the part (100) for UV irradiation of the O-18 enriched water sample, the part (200) for heat exchange of the UV irradiated sample to cool it down, the part (300) for spectroscopic diagnosis to monitor the concentration of the initial organic impurities and the intermediate products, the part (400) for sample reserving and also for temperature and pH monitoring, gaseous oxygen may be supplied in this part by bubbling or in the middle of the flow line right before the part (100), the part (500) for circulating the target sample, a peristaltic pump in this invention, and the part (600) for oxygen supplying to maintain the DO concentration in the sample.

As a UV generating lamp (101) in the part (100), a lamp that can generate the wavelength shorter that 200 nm including the low pressure Hg lamp or Xenon Eximer (172 nm) lamp might be used. The low pressure Hg lamp is suitable in our case since it produce the wavelengths both 185 nm and 254 nm at the same time. It is also advantageous that the wavelengths from the Hg lamp can be variable by adjusting the pressure of the Hg in the lamp.

To irradiate the sample with the UV or VUV (UV includes VUV also hereafter) wavelength generated from the part (101), the transparent quartz cell that flows the sample is situated closely to the part (101). Although the quartz cell may be set in parallel with the part (101), it is proper to use the helical type quartz cell (102) closely circulating the UV lamp to maximize the UV irradiation to the sample.

Length of the part (102) is not restricted specifically since it should be designed based on the size of the purification system to be considered and also the quantity of the sample to be purified. However, it is important to restrict the inner diameter and thickness of the part (102) to 2 mm and 1 mm respectively since it determines the transmittance of the UV, especially VUV, transmitted into the quart cell (102).

This is due to the characteristics of the wavelength shorter than 200 nm which is in the VUV (Vacuum Ultra-Violet) region, i.e. the most of the quartz transmitted energy of VUV is absorbed strongly within 2 mm of the water sample in general. If the diameter of the quartz cell is larger than 2 mm, the irradiation efficiency of VUV wavelength of the sample may be lowered since a certain portion of the sample may not absorb enough energy for dissociation of the organics, water molecule and DO.

Also, the thinner wall of the quartz cell may be preferred to maximize the intensity of the transmitted UV radiation. It is proper to have at least 1 mm thickness for the quartz cell wall to hold the mechanical tension and thermal stress from the purification process and also manufacturing availability. In general, a half of the initial intensity of VUV radiation is absorbed when it is transmitted the 1 mm thick quartz cell.

The part (200) is to cool down the irradiated sample which is warmed by energy (heat) absorption during the process in the part (100). This is especially important to increase the recovery efficiency, by condensing the water vapor back to liquid water, of the sample which is highly valuable, and also it will reduce the vapor pressure in the reservoir. As a heat exchanger, a concentric double layered cooling system can be used while there is no any specific restriction.

The part (300) includes the UV-VIS spectrometer that can monitor the degree of the sample's organic impurity together with pH meter qualitatively while the FTIR (Fourier-Transform Infra-Red) spectrometer and GC (Gas Chromatograph) can analyze the concentration of each impurity before and after the purification process quantitatively. FTIR and GC are the instruments that can measure the concentration of the samples by comparing the fundamental absorption peaks of each organic compound and the moving speed of each material based on the absorption characteristics and solubility respectively. These spectroscopic results will determine the availability of the purified samples if they are feasible for reuse in the cyclotron again.

As a reservoir that can contain a circulating sample during the purification process, the part (400) is preferred to use a flask or else having 3 to 4 inlets for temperature sensor (401), pH meter sensor (402), and oxygen supply (600). The temperature sensor and pH meter monitor the conditions of the processing sample such as the temperature and the pH level. Especially pH level is important to monitor generation of acids, which confirms the degree of the purification obtained from the UV-VIS spectrometer.

The part (400) also includes the system (600) that can supply the gaseous oxygen into the target sample. The part (600) can supply the gaseous oxygen into the processing sample by using mass flow meter and the gaseous oxygen is dissolved by bubbling in the sample.

The part (500) is a peristaltic pump operated by any means of electricity or fossil fuel including gas and coal. There is no any restriction for the part (500) as long as it can flow the processing sample without any contamination.

The mentioned O-18 enriched cyclotron target water sample is circulated through each part presented in this invention continuously by the part (500) using a stainless steel tube or (and) a chemical resistive Tygon tube. The DO supplied into the part (400) or in the middle of the flow line before entering the UV irradiation part (100) is dissociated to the reactive oxygen species under irradiation of 185 nm wavelength.

The reactive oxygen species generate $CO_2$ and $H_2O$ as a result of reaction with the intermediate by-products produced from dissociation of the initial organic impurities. The dissociation of the initial organic impurities may be caused by the irradiation of the both 254 nm (UV) and also 185 nm (VUV) wavelengths. By monitoring the spectroscopic UV-VIS spectroscopic spectrum from the part (300), the degree of the impurities in the sample is determined. Finally, the results from FTIR and GC will determine the availability of the purified samples if they are feasible for reuse in the cyclotron again.

Description of the Preferred Embodiment

Here after, the present invention is explained in detail by describing the experimental examples.

As mentioned earlier, the organic impurities contaminated in the O-18 enriched target water during the radioisotope F-18 production and [F-18]FDG synthesis are acetone ($CH_3COCH_3$), ethanol ($CH_3CH_2OH$), methanol ($CH_3OH$), and acetonitrile ($CH_3CN$). The present embodiment of the invention clearly indicates the removal efficiency of the organic impurities conducted by the present invention which use UV irradiation combined with the photo-catalytic reaction of the DO.

Figure 3:
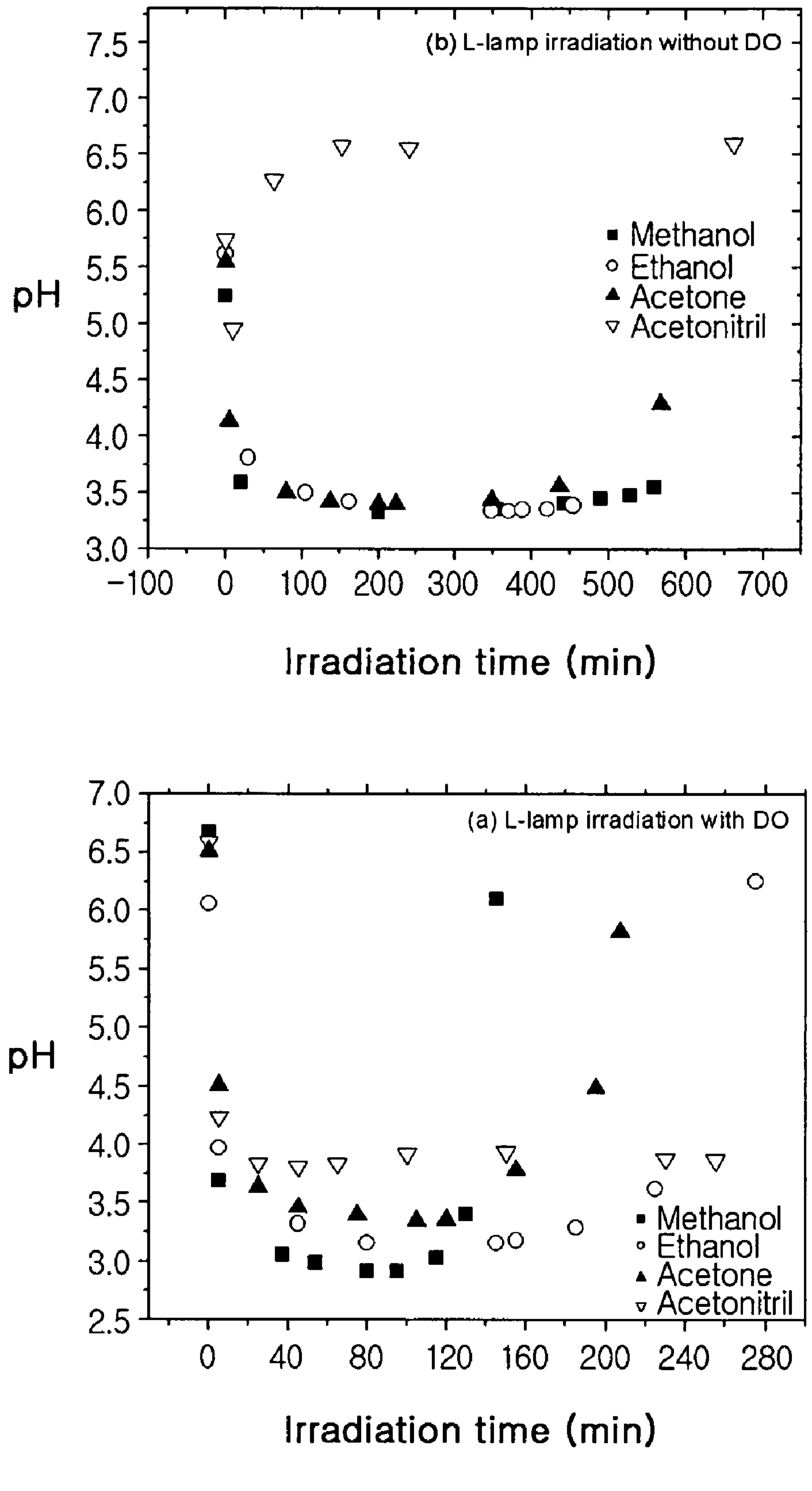
FIG. 3 are the graphs illustrating pH variations in the UV irradiated sample under the L-lamp irradiation (a) with DO and (b) without DO.

Firstly, the samples (~25 mL) were prepared by adding organic compounds including ethanol, methanol, acetone, and acetonitrile into the deionized water with the 0.1% volumetric concentration respectively. The prepared samples were UV irradiated without DO (standard case) and with DO (experimental case) at the same experimental conditions. FIG. 2*a* to FIG. 2*g* show the UV-VIS spectrum obtained during the purification process in the sequential order. As it can be seen in the figures, absorbance at <250 nm region increases as UV irradiation time increases for all cases confirming generation of acids as a by-product, which corresponds to the pH variances of the sample in FIG. 3. The experiments were conducted until the spectrum and pH level indicate that the purification of the organics is completed.

And then, the samples contaminated with four organic compounds were prepared by mixing them all with the 0.1% volumetric concentrations respectively. The experiments were conducted without DO (standard case) and with DO (experimental case) at the same experimental conditions. The samples were taken every hour to track the degree of the concentration of the organics and they were analyzed by GC.

After the purification processes were completed, the quantities of the samples were measured. Quantities of the recovered samples for most cases were more than 98.5%. Lost portion in the samples might be inevitable $CO_2$, $NH_4$, or water vapor which escaped through the small orifice made in the part (400). To minimize the loss of water vapor, the heat exchange part (200) maintains the temperature of the sample at 10° C.~20° C. depending on the tap water temperature.

Figure 4:
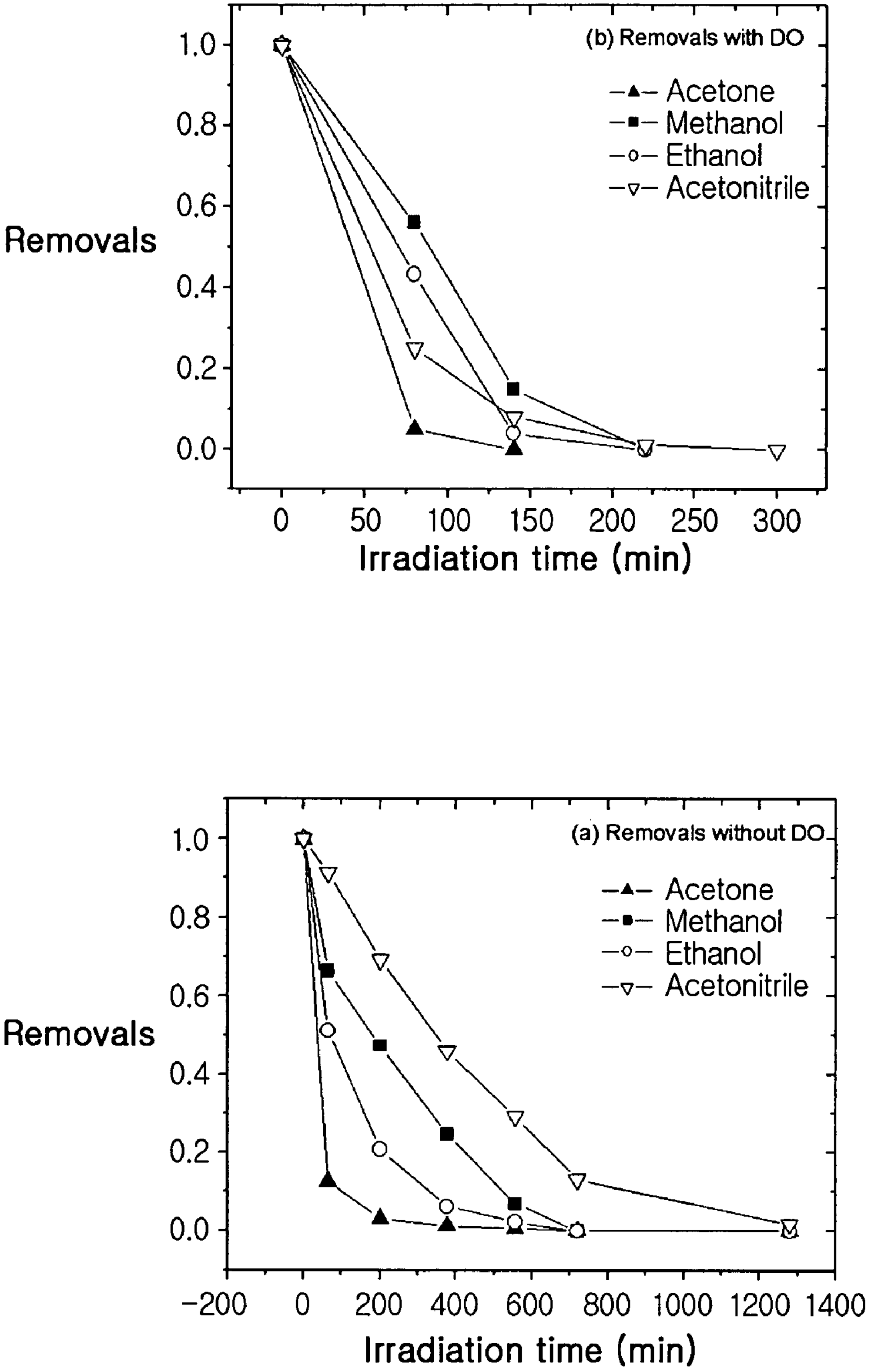
FIG. 4 are the graphs illustrating Removals of organic impurities under the L-lamp UV irradiation (a) with aid of DO and (b) without aid of DO.

As a conclusion, purification of the organic impurities under UV irradiation with aid of the catalytic reaction of DO is more efficient about 4~5 times than those without DO as shown in FIG. 4.

As stated, the present invention can offer an efficient use of O-18 enriched cyclotron target water by purifying the organic impurities in it. Compared to the commercialized purification technique which uses UV irradiation together with cold distillation, this invention, more specifically, present a technical solution and apparatus with high recovery rate and efficiency for purification of the used O-18 enriched cyclotron target contaminated by various organic impurities with aid of the catalytic reaction of DO under UV irradiation.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of purifying used O-18 enriched cyclotron target water contaminated by various organic compounds, the method comprising:

supplying continuously and directly gaseous oxygen into the target water to be purified;

irradiating UV rays having wavelengths of 254 nm and 185 nm on the target water; and releasing gases generated during a purification process by oxidation, wherein, in the supplying gaseous oxygen, the gaseous oxygen is supplied by bubbling into the target water.

2. The method of claim 1, wherein, in the supplying gaseous oxygen, the gaseous oxygen is supplied to maintain concentration of dissolved oxygen at 10 to 40 ppm in the target water.

3. The method of claim 1, wherein, in the supplying gaseous oxygen, the gaseous oxygen is supplied by connecting an oxygen gas line directly to a sample delivery tube before entering a UV irradiator.

4. The method of claim 1, wherein the irradiating UV comprises:

generating intermediate by-products by one of C—H bond and C—C bond disassociation caused by irradiation of the UV rays having the wavelengths of 254 nm and 185 nm;

generating —OH radicals from water molecules and reactive oxygen species (ROS) from the dissolved oxygen supplied into a sample under irradiation of the UV rays having the wavelength of 185 nm; and generating $CO_2$ and $H_2O$ as a result of oxidation reaction of the —OH radicals and the ROS with the intermediate by-products of the organic compounds.

5. The method of claim 4, wherein the irradiating UV further comprises generating ozone $O_3$ acting as a catalysis for purification of the organic compounds by reaction of the ROS with the dissolved oxygen.

6. The method of claim 1, further comprising cooling a sample by heat exchange to maintain a constant temperature of the target water.

7. An apparatus for purifying used O-18 enriched cyclotron target water contaminated by various organic compounds, the apparatus comprising:

a reservoir for containing the target water;

a UV irradiator for irradiating UV rays on the target water transferred from the reservoir;

a heat exchanger for cooling the target water of a high temperature, transferred from the UV irradiator;

a spectroscopic part for measuring concentration of organic impurities in the target water transferred from the UV irradiator; and a peristaltic pump for circulating the target water, wherein the apparatus is configured to allow the target water in a tube to receive gaseous oxygen continuously and directly into the reservoir, flow out from the reservoir through the UV irradiator, the heat exchanger, and the spectroscopic part, and flow into the reservoir again, and to allow the gaseous oxygen to bubble into the target water.

8. The apparatus of claim 7, wherein the reservoir comprises an oxygen supplier for supplying gaseous oxygen, a temperature sensor, and a pH meter.

9. The apparatus of claim 7, wherein the reservoir is a flask including three mouths.

10. The apparatus of claim 7, wherein the UV irradiator comprises at least one UV generator for generating UV rays having wavelengths of 254 nm and 185 nm, selected from a group consisting of a low pressure mercury lamp and a Xenon Eximer lamp, wherein a transparent quartz cell, configured to allow the target water to pass through the transparent quartz cell, is installed close to the UV generator.

11. The apparatus of claim 10, wherein the transparent quartz cell is installed to be wound helically around the UV generator.

12. The apparatus of claim 10, wherein an inside diameter of the transparent quartz cell is less than 2 mm and a thickness of a cell wall of the transparent quartz cell is less than 1 mm.

13. The apparatus of claim 7, wherein the heat exchanger is configured to maintain a temperature of the target water at 10 to 20° C.

14. The apparatus of claim 7, wherein the spectroscopic part comprises an UV-VIS spectrometer and a quartz flow cell for monitoring the target water.

15. The apparatus of claim 7, wherein the spectroscopic part comprises at least one selected from a group consisting of a Fourier Transform infrared spectrometer and a gas chromatography.

16. The apparatus of claim 7, wherein the tube is at least one selected from a group consisting of a stainless steel tube and a chemical resistive Tygon tube.

* * * * *

UNITED STATES PATENT AND TRADEMARK OFFICE
CERTIFICATE OF CORRECTION

PATENT NO. : 7,659,522 B2
APPLICATION NO. : 11/806310
DATED : February 9, 2010
INVENTOR(S) : Jae Woo Kim et al.

It is certified that error appears in the above-identified patent and that said Letters Patent is hereby corrected as shown below:

In Column 3, Line 24: Replace "(.OH)" with --(·OH)--.

In Column 3, Line 50: Replace "(.OH)" with --(·OH)--.

In Column 3, Line 57: Replace "(.OH)" with --(·OH)--.

In Column 4, Line 8: Replace "(.OH)" with --(·OH)--.

In Column 4, Line 12, Equation 5: Replace "$H_2O+hv_{185nm}\rightarrow.H+.OH$" with --$H_2O+hv_{185nm}\rightarrow\cdot H+\cdot OH$--.

In Column 4, Line 16: Replace "(.OH)" with --(·OH)--.

In Column 4, Line 29: Replace "(.OH)" with --(·OH)--.

In Column 4, Line 34: Replace "(.OH)" with --(·OH)--.

Signed and Sealed this

Second Day of November, 2010

David J. Kappos
*Director of the United States Patent and Trademark Office*